United States Patent
Lin et al.

(10) Patent No.: US 6,952,303 B2
(45) Date of Patent: Oct. 4, 2005

(54) INTERFEROMETRIC MODULATION PIXELS AND MANUFACTURING METHOD THEREOF

(75) Inventors: Wen-Jian Lin, Hsinchu (TW); Hsiung-Kuang Tsai, Taipei (TW)

(73) Assignee: Prime View International Co., LTD, Hsinchu (TW)

(*) Notice: Subject to any disclaimer, the term of this patent is extended or adjusted under 35 U.S.C. 154(b) by 0 days.

(21) Appl. No.: 10/815,947

(22) Filed: Apr. 2, 2004

(65) Prior Publication Data

US 2005/0046923 A1 Mar. 3, 2005

(30) Foreign Application Priority Data

Aug. 29, 2003 (TW) ........................................ 92124032 A

(51) Int. Cl.[7] ........................ G02F 1/1335; G02B 26/00
(52) U.S. Cl. ........................................ 359/291; 359/290
(58) Field of Search ................................ 359/291, 290, 359/245, 247, 315, 260, 263; 438/706

(56) References Cited

U.S. PATENT DOCUMENTS

| 5,835,255 A | 11/1998 | Miles ........................ 356/291 |
| 6,016,693 A | * 1/2000 | Viani et al. ................... 73/105 |
| 6,577,785 B1 | * 6/2003 | Spahn et al. .................. 385/22 |

* cited by examiner

Primary Examiner—Scott J. Sugarman
Assistant Examiner—Richard Hanig
(74) Attorney, Agent, or Firm—Baker & Hostetler LLP

(57) ABSTRACT

A protection layer covers the cavity-side surface of a bottom electrode of a interferometric modulation pixel. Consequently, the protective layer protects the surface of the bottom electrode while a sacrificial layer between the bottom electrode and the top electrode is being etched. Thus, the distance between the bottom electrode and the top electrode is maintained, thereby ensuring that only the light with desired wavelengths is reflected by the interferometric modulation pixel.

23 Claims, 3 Drawing Sheets

INTERFEROMETRIC MODULATION PIXELS AND MANUFACTURING METHOD THEREOF

BACKGROUND

1. Field of Invention

The present invention relates to a planar panel display and a manufacturing method thereof. More particularly, the present invention relates to an interferometric modulation pixel and a manufacturing method thereof.

2. Description of Related Art

Planar displays are extremely popular in the portable and limited-space display market because they are lightweight and small. To date, in addition to liquid crystal display (LCD), organic light-emitting diode (OLED) and plasma display panel (PDP) display panels, a module of the optical interference display has been investigated.

The features of an interferometric modulation pixel of the optical interference display include low electrical power consumption, short response time and bi-stable status. Therefore, the optical interference display can be applied in planar display panels, especially in portable products such as mobile phones, personal digital assistants (PDA), and portable computers.

U.S. Pat. No. 5,835,255 discloses a modulator array for visible light, and an interferometric modulation pixel of the modulator array can be used in a planar display panel. FIG. 1A illustrates a cross-sectional diagram showing an interferometric modulation pixel in the prior art. Every interferometric modulation pixel 100 comprises a bottom electrode 102 and a top electrode 104. The bottom electrode 102 and the top electrode 104 are separated by supports 106, thus forming a cavity 108. The distance between the bottom electrode 102 and the top electrode 104, that is, the depth of cavity 108, is D and is usually less than 1 μm. The bottom electrode 102 is a light-incident electrode and partially absorbs visible light according to absorption rates of various wavelengths. The top electrode 104 is a light-reflection electrode which is flexed when a voltage is applied to it.

A white light is usually used as an incident light source for the interferometric modulation pixel 100 and represents a mixture of various wavelengths (represented by λ) of light in the visible light spectrum. When the incident light shines through the bottom electrode 102 and enters the cavity 108, only the visible light with wavelength ($\lambda_1$) corresponding to the formula 1.1 is reflected back, that is, $$2D=N\lambda_1 \tag{1.1}$$

wherein N is a natural number.

When twice the cavity depth, 2D, equals one certain wavelength $\lambda_1$ of the incident light multiplied by any natural number, N, a constructive interference is produced, and a light with the wavelength $\lambda_1$ is reflected back. Thus, an observer viewing the panel from the direction of the incident light will observe light with the certain wavelength $\lambda_1$ reflected back at him. The display unit 100 here is in an "open" state, i.e. a "bright" state.

FIG. 1B illustrates a cross-sectional diagram of the interferometric modulation pixel 100 in FIG. 1A after a voltage is applied to it. Under the applied voltage, the top electrode 104 is flexed by electrostatic attraction toward the bottom electrode 102. At this moment, the distance between the walls 102 and 104, the depth of cavity 108, becomes d and may equal to zero. The D in the formula 1.1 is hence replaced with d, and only the visible light with another certain wavelength $\lambda_2$ satisfying the formula 1.1 produces constructive interference and reflects through the top electrode 102. However, in the interferometric modulation pixel 100, the bottom electrode 102 is designed to have a high absorption rate for the light with the wavelength $\lambda_2$. Thus, the incident visible light with the wavelength $\lambda_2$ is absorbed, and the light with other wavelengths is annulled by destructive interference. The incident visible light of all wavelengths is thereby filtered, and the observer is unable to see any reflected visible light when the top electrode 104 is flexed. The interferometric modulation pixel 100 is now in a "closed" state, i.e. a "dark" state.

As described above, under the applied voltage, the top electrode 104 is flexed by electrostatic attraction toward the bottom electrode 102 such that the interferometric modulation pixel 100 is switched from the "open" state to the "closed" state. When the interferometric modulation pixel 100 is switched from the "closed" state to the "open" state, the voltage for flexing the top electrode 104 is removed and the top electrode 104 elastically returns to the original state, i.e. the "open" state as illustrated in FIG. 1A.

In light of foregoing, the interferometric modulation pixel 100 is obtained by combining thin film interference principles of optics with reflective plate and microelectromechanical system (MEMS) processes. In a MEMS process, the cavity 108 is formed by etching a sacrificial layer between the bottom electrode 102 and the top electrode 104. The material used as the sacrificial layer is usually metal, polysilicon or amorphous silicon. The silicon-based material is inexpensive compared to the metallic material and is often preferred when developing manufacturing processes. However, if the etchant that is used to remove the sacrificial layer does not properly etch selectively, the surface of the bottom electrode 102 is damaged such that the cavity depth D and the optical thin film of the bottom electrode are adversely affected. That is, the reflected wavelength $\lambda_1$ is different from what is intended, damaging the color uniformity of the optical interference display.

SUMMARY

In one aspect, the present invention provides an interferometric modulation pixel and a manufacturing method of which a protection layer is formed on the bottom electrode to protect the upper surface of the bottom electrode.

In another aspect, the present invention provides an interferometric modulation pixel and a manufacturing method of which a protection layer is formed on the bottom electrode to stabilize the quality of the optical thin film of the bottom electrode.

In yet another aspect, the present invention provides an interferometric modulation pixel and a manufacturing method that enhances the image display quality of the planar optical interference display.

In accordance with the foregoing and other aspects of the present invention, the present invention provides a method of manufacturing an interferometric modulation pixel. A first electrode layer, a protection layer and a sacrificial layer are sequentially formed on a transparent substrate, wherein an uppermost layer of the first electrode layer is an insulating layer. At least two first openings are formed in the sacrificial layer, the protection layer and the first electrode layer to demarcate and define a first electrode. A photosensitive material is formed on the sacrificial layer and within the first openings and is then partially removed to leave supports in the first openings. A second electrode layer is formed on the sacrificial layer and the supports. Then, at least two second openings are formed in the second electrode layer to demarcate and define a second electrode such that the two second openings perpendicularly crisscross the two first openings. The sacrificial layer is then removed.

In the foregoing, the protection layer does not contain silicon and preferably comprises metal oxides such as aluminum oxide, titanium oxide or tantalum oxide.

In accordance with the foregoing and other aspects of the present invention, the present invention provides an interferometric modulation pixel. The interferometric modulation pixel comprises a first electrode, a movable second electrode situated above the first electrode, two supports between the first electrode and the second electrode for forming a cavity within the first and second electrodes, and a protection layer on the cavity-side surface of the bottom electrode. In the foregoing, the protection layer does not contain silicon and preferably comprises metal oxides such as aluminum oxide, titanium oxide or tantalum oxide.

In light of the preferred embodiments of the present invention described above, a non-silicon protection layer covers the insulating layer of the bottom electrode to separate the sacrificial layer from the insulating layer, both of which are silicon-based. Hence, the bottom electrode surface is not damaged by the etchant, and the bottom electrode structure is thereby kept intact to provide high display quality for an optical interference display.

It is to be understood that both the foregoing general description and the following detailed description are made by use of examples and are intended to provide further explanation of the invention as claimed.

BRIEF DESCRIPTION OF THE DRAWINGS

The accompanying drawings are included to provide a better understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

This invention provides an interferometric modulation pixel and a manufacturing method thereof that eliminates damage on the bottom electrode surface occurring during the sacrificial layer removal process. In a preferred embodiment of this invention, the bottom electrode is covered by a protection layer. Therefore, the bottom electrode surface is not damaged by the etchant used to remove the sacrificial layer, and the bottom electrode structure is kept intact so as to provide high display quality for the optical interference display.

Reference will now be made in detail to the present preferred embodiments of the invention, examples of which are illustrated in the accompanying drawings. FIGS. 2A–2D are cross-sectional diagrams showing a process of manufacturing an interferometric modulation pixel according to a preferred embodiment of this invention.

Figure 1A:
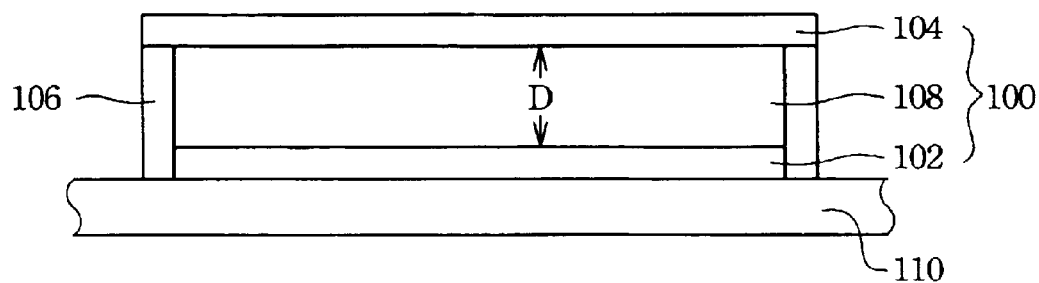
FIG. 1A illustrates a cross-sectional diagram showing an interferometric modulation pixel in the prior art.
Figure 1B:
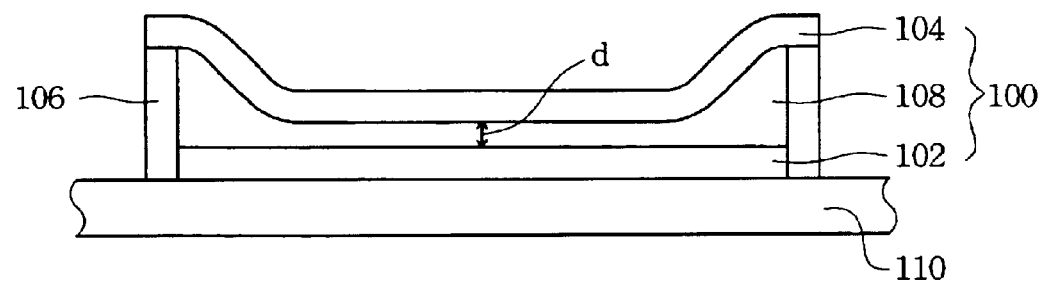
FIG. 1B illustrates a cross-sectional diagram of the interferometric modulation pixel 100 in FIG. 1A after a voltage is applied to it.
Figure 2A:
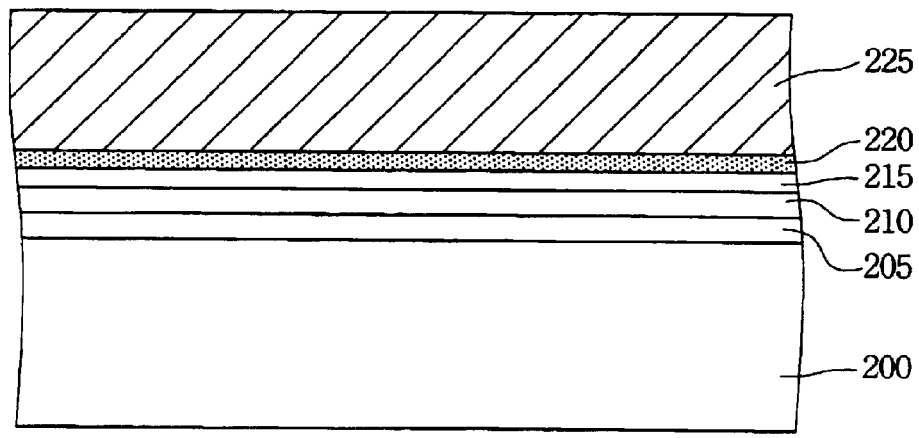
FIGS. 2A–2D are cross-sectional diagrams showing a process of manufacturing an interferometric modulation pixel according to a preferred embodiment of this invention.

In FIG. 2A, a transparent conductive layer 205, a light-absorption layer 210, an insulating layer 215, a protection layer 220 and a sacrificial layer 225 are sequentially formed on a transparent substrate 200.

The transparent conductive layer 205 is preferably made of indium tin oxide (ITO), indium zinc oxide (IZO), zinc oxide or indium oxide. The light-absorption layer 210 can be made of a metal such as aluminum, silver or chromium. The insulating layer 215 is preferably comprised of silicon oxide or silicon nitride. If the sacrificial layer 225 is comprised of amorphous silicon or polysilicon, the protection layer 220 is preferably a non-silicon material such as a metal oxide like aluminum oxide, titanium oxide or tantalum oxide.

Figure 2B:
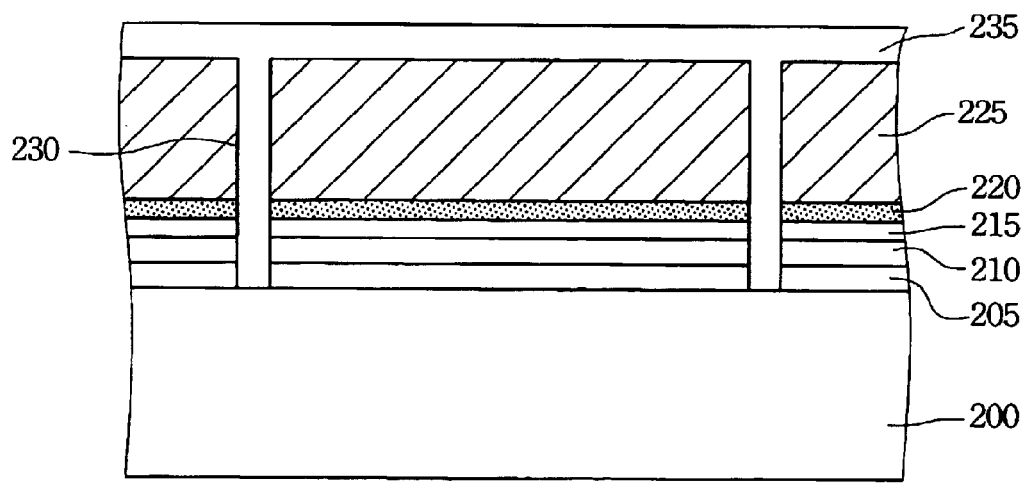

In FIG. 2B, at least two first openings 230 are formed in the sacrificial layer 225, the protection layer 220, the insulating layer 215, the light-absorption layer 210 and the transparent conductive layer 205 by a process such as photolithography and etching to define a bottom electrode. The first openings 230 are substantially oriented perpendicularly to the diagram surface such that the openings can be likened to channels, and only the cross-sections of the channels are visible in the diagram. The bottom electrode of the interferometric modulation pixel is located between the two first openings 230 and is formed by stacking the transparent conductive layer 205, the light-absorption layer 210, and the insulating layer 215.

Then, a photosensitive material 235 is coated on the sacrificial layer 225 and inside of the first openings 230. The photosensitive material 235 comprises positive photoresist, negative photoresist, or various kinds of photosensitive polymers such as polyimide, acrylic resins, or epoxy resins.

Figure 2C:
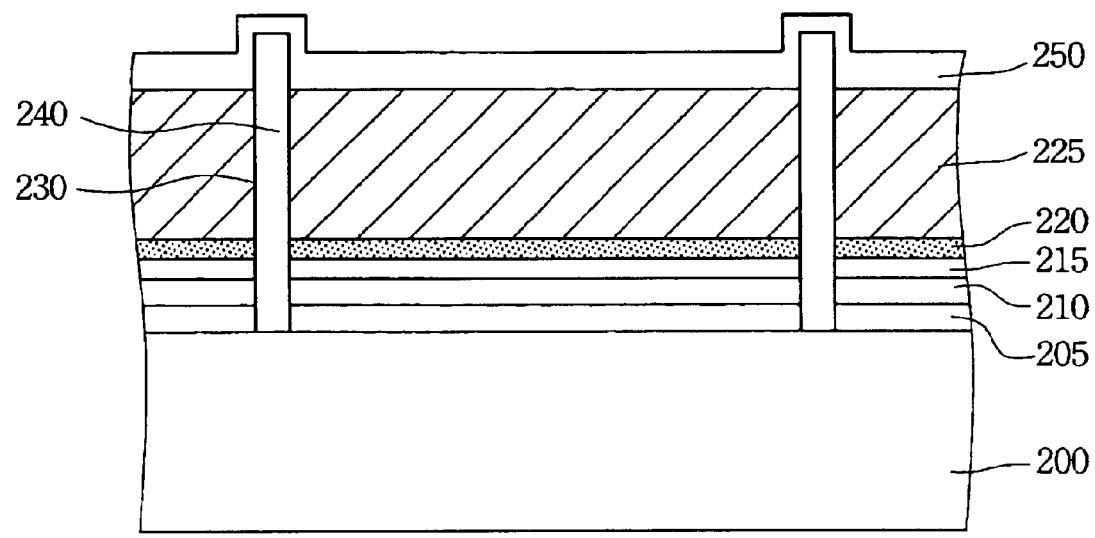

In FIG. 2C, supports 240 in the first openings 230 are formed by exposing and developing the photosensitive material 235. A reflective conductive layer 250 is formed on the sacrificial layer 225 and the supports 240. Then, at least two second openings (not shown in FIG. 2C) are formed in the reflective conductive layer 250 by a process such as photolithography and etching to demarcate and define a top electrode between the two second openings. The orientation of the second openings is parallel to the diagram surface. The top electrode is formed from the reflective conductive layer 250 and is a light-reflection electrode. The top electrode can be flexed to move up and down. The material used as the reflective conductive layer 250 must be reflective so as to reflect the incident light from the bottom electrode. The reflective conductive layer 250 preferably comprises a metal.

Figure 2D:
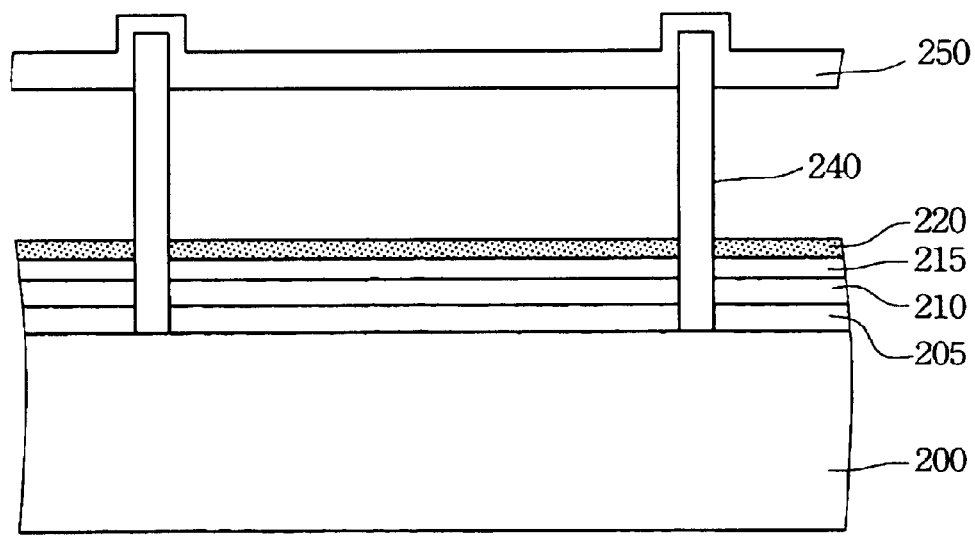

In FIG. 2D, the sacrificial layer 225 is removed by a structural release etching process, such as remote plasma etching. The precursor of the remote plasma includes a fluorine-based or chlorine-based etchant, such as xenon difluoride, carbon tetrafluoride, boron trichloride, nitrogen trifluoride, sulfur hexafluoride, or combinations thereof.

In light of the preferred embodiments of the present invention described above, a non-silicon protection layer covers the insulating layer of the bottom electrode to separate the sacrificial layer from the insulating layer, both of which are silicon-based. Therefore, the etching selectivity of the sacrificial layer compared to the protection layer is much greater than compared to the insulating layer. Consequently, the bottom electrode surface is not damaged by the etchant, and the bottom electrode structure is thereby kept intact to provide high display quality for an optical interference display. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of manufacturing an interferometric modulation pixel, comprising:
   forming a first electrode layer on a transparent substrate, wherein an uppermost layer of the first electrode layer is an insulating layer;
   forming a protection layer on the insulating layer
   forming a sacrificial layer on the protection layer;
   forming at least two first openings in the sacrificial layer, the protection layer and the first electrode layer to demarcate and define a first electrode, wherein the first electrode is made from the first electrode layer;
   coating a photosensitive material on the sacrificial layer and in the first openings;
   patterning the photosensitive material to form supports in the first openings;
   forming a second electrode layer on the sacrificial layer and the supports;
   forming at least two second openings in the second electrode layer to define a second electrode, wherein the second electrode is made from the second electrode layer and the orientation of the second openings is perpendicular to the two first openings; and
   removing the sacrificial layer.

2. The method of claim 1, wherein the insulating layer comprises silicon oxide or silicon nitride.

3. The method of claim 1, wherein the protection layer does not contain silicon.

4. The method of claim 1, wherein the protection layer comprises metal oxides.

5. The method of claim 1, wherein the protection layer comprises aluminum oxide, titanium oxide or tantalum oxide.

6. The method of claim 1, wherein the sacrificial layer comprises metal, polysilicon or amorphous silicon.

7. The method of claim 1, wherein a method of forming the first openings and the second openings comprises photolithography and etching.

8. The method of claim 1, wherein the photosensitive material comprises a photoresist or a photosensitive polymer.

9. The method of claim 1, wherein a method of patterning the photosensitive material comprises exposing and developing the photosensitive material.

10. The method of claim 1, wherein the sacrificial layer is removed by remote plasma etching.

11. The method of claim 1, wherein a plasma precursor used by the remote plasma etching comprises a fluorine-based or chlorine-based etchant.

12. An interferometric modulation pixel, comprising:
    a first electrode;
    a movable second electrode being situated above the first electrode and being parallel to the first electrode;
    two supports between the first electrode and the second electrode to form a cavity within the first and the second electrodes; and
    a protection layer on a cavity-side surface of the first electrode to protect the first electrode when a sacrificial layer between the first electrode and the second electrode is removed.

13. The interferometric modulation pixel of claim 12, wherein the protection layer does not contain silicon.

14. The interferometric modulation pixel of claim 12, wherein the protection layer comprises metal oxides.

15. The interferometric modulation pixel of claim 12, wherein the protection layer comprises aluminum oxide, titanium oxide or tantalum oxide.

16. A method of manufacturing an interferometric modulation pixel, comprising:
    forming a first transparent conductive layer on a transparent substrate;
    forming a light-absorption layer on the first transparent conductive layer;
    forming an insulating layer on the light-absorption layer;
    forming a protection layer on the insulating layer;
    forming a sacrificial layer on the protection layer;
    forming at least two first openings in the sacrificial layer, the protection layer, the insulating layer, the light-absorption layer and the transparent conductive layer to demarcate and define a first electrode between the two first openings, wherein the first electrode is made by stacking the insulating layer, the light-absorption layer and the transparent conductive layer;
    coating a photosensitive material on the sacrificial layer and in the first openings;
    patterning the photosensitive material to form supports in the first openings;
    forming a reflective conductive layer on the sacrificial layer and the supports;
    forming at least two second openings in the reflective conductive layer to demarcate and define a second electrode between the two second openings, wherein the second electrode is made from the reflective conductive layer and the orientation of the two second openings is perpendicular to the two first openings; and
    removing the sacrificial layer.

17. The method of claim 16, wherein the insulating layer comprises silicon oxide or silicon nitride.

18. The method of claim 16, wherein the protection layer does not contain silicon.

19. The method of claim 16, wherein the protection layer comprises metal oxides.

20. The method of claim 16, wherein the protection layer comprises aluminum oxide, titanium oxide or tantalum oxide.

21. The method of claim 16, wherein the sacrificial layer comprises metal, polysilicon or amorphous silicon.

22. The method of claim 16, wherein the sacrificial layer is removed by remote plasma etching.

23. The method of claim 16, wherein a plasma precursor used by the remote plasma etching comprises a fluorine-based or chlorine-based etchant.

* * * * *